July 6, 1937.  W. ECKOLD  2,086,218
MANUFACTURE OF RIVET CONNECTIONS
Filed Feb. 9, 1934
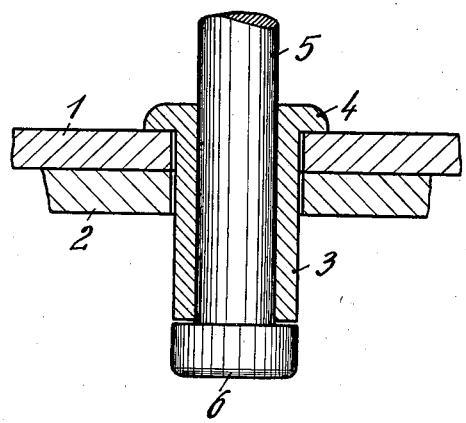
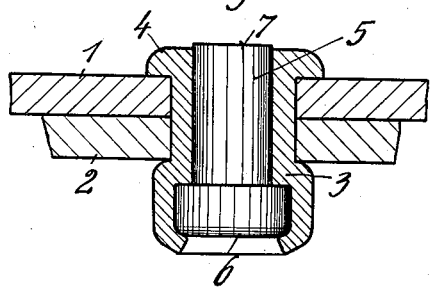
Inventor:
Walter Eckold
by [signature]
Atty.

Patented July 6, 1937

2,086,218

UNITED STATES PATENT OFFICE 2,086,218

MANUFACTURE OF RIVET CONNECTIONS

Walter Eckold, Dessau, Germany, assignor to Junkers Flugzeug-und-Motorenwerke Aktiengesellschaft, Dessau, Germany Application February 9, 1934, Serial No. 710,461
In Germany February 21, 1933

2 Claims. (Cl. 218—29)

My invention relates to the manufacture of rivet connections and more particularly to connections established by means of hollow or tubular rivets.

It is an object of my invention to provide a connection of this kind, which is liquid-tight and particularly adapted for use in connecting parts of hollow bodies which are accessible only from one side, for instance from the outside.

The rivet connection, to which the present invention relates, belongs to the class in which a solid rivet inserted in the hollow rivet and formed with an enlarged portion is moved axially relative to the hollow rivet by means of a nut, the enlarged portion of the solid rivet or bolt being relied upon to form the closing head. Rivet connections of this type have proved objectionable since they require a threaded inner rivet or bolt and a nut, which moreover projects above the surfaces of the parts to be connected, which is particularly objectionable in aircraft construction.

In the drawing affixed to this specification and forming part thereof, a rivet connection embodying the present invention is illustrated diagrammatically by way of example.

In the drawing,

Fig. 1 is an axial section of the parts assembled before riveting.

Fig. 2 is a similar view of the parts in position after the connection has been established.

Referring to the drawing, 1 and 2 are two pieces of sheet metal or metal plates designed to be fixed to each other by riveting. 3 is the shaft and 4 the head of a hollow rivet extending through the rivet holes provided in the two parts 1 and 2, the head 4 being applied against the surface of plate 1, while the shaft projects beyond the part 2 which may be assumed to be the wall of the hollow body such as a metal tube or the like. 5 is the shaft and 6 the head of a solid rivet extending through the hollow rivet with the head 6 abutting against the inner projecting end of the tubular shaft 3, while the solid shaft 5 projects from the hollow head 4.

In order to form the projecting end of the hollow shaft 3 into a closing head and to fix the head 5 of the inner rivet in the hollow shaft 3, the projecting end of shaft 5 is gripped by a suitable tool, and a forcible axial pull is exerted thereon, the head 4 of the hollow rivet serving as an abutment for the tool. The head 6 will now cause the free end of the hollow shaft 3 to expand and will enter the expanded end of this shaft. However, since the expanding of the hollow shaft occurs within the limits of elasticity, the expanded end of the hollow shaft will spring back to a certain extent and will apply itself against the curved portion of the head 6 as shown in Fig. 2, thereby firmly embracing this head and preventing it from getting loose. The projecting end of the solid shaft 5 being cut off at 7, no projection is formed beyond the head 4 of the hollow rivet. When set, my rivet comprises a tubular element having a shank at one end and a head at the other end and provided with a bore, and a solid element having a head at one end and an elongated shank at the other end inserted into said bore opposite the headed end of said tubular element, the said two elements being assembled with their headed ends opposite each other and then inserted into an opening in parts to be riveted with the shank of said tubular element and the head of said solid element protruding through said opening and with the shank of said solid element protruding through the headed end of said tubular element on the working side of the parts to be riveted, said protruding shank being adapted to be drawn during the setting operation, the protruding shank of said tubular element being sufficiently elastic to be expanded by said drawing operation to receive the head of said solid element and then to contract embracing and at least partially covering said head.

The process of the present invention comprises assembling the solid and tubular elements of my rivet as shown in Fig. 1 and inserting the so-assembled elements into an opening in parts to be united so that the head of said solid element and a portion of the shank of said tubular element protrudes through said opening, the head of said tubular element abutting said opening, then drawing on the shank of said solid element while holding the head of said tubular element against said parts, pulling the head of said solid element into the protruding elastic shank of said tubular element in such manner that said shank expands to receive said head, the end of said shank then at least partially embedding and covering the end of said head and said shank being thereby expanded against said parts to be united, thus setting said rivet.

Obviously this rivet connection is superior to similar connections hitherto known in that it does not project beyond the outer surface and does not require a threaded bolt or solid rivet nor a nut to retain it in the hollow rivet. In consequence thereof, this rivet connection is also particularly suited for mass production.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. A set composite metallic rivet uniting two pieces of material, comprising a headed tubular element provided with a shank extending through an opening in said pieces with its head protruding from the working side of said united pieces, and a headed solid element having a shank passing through said tubular element cut off on the working side of said united pieces substantially flush with the head of said tubular element, the head of said solid element being at least partially embedded in and enclosed by the expanded shank of said tubular element which is contracted at its tip about the head of the solid element on the non-working side of said pieces of material.

2. In the riveting of parts by means of a composite metallic rivet comprising a tubular element having a shank made of elastic metal at one end and an enlarged head at the other end and provided with a longitudinal bore, and a solid element provided with an elongated shank fitting said bore and a head having a diameter not substantially exceeding the diameter of the shank of said tubular element, the said two elements being assembled by insertion of the shank of said solid element into the shank of said tubular element with the head of said solid element abutting the shank of said tubular element and with the shank of said solid element protruding from the head of said tubular element; the process which comprises inserting the so-assembled elements into an opening in parts to be united so that the head of said solid element and a portion of the shank of said tubular element protrudes through said opening, the head of said tubular element abutting said opening, then drawing on the shank of said solid element while holding the head of said tubular element against said parts, pulling the head of said solid element into the protruding elastic shank of said tubular element in such manner that said shank expands to receive said head, the end of said shank then at least partially contracting to embed and partially to enclose the end of said head and said shank being thereby expanded against said parts to be united, thus setting said rivet.

WALTER ECKOLD.